US012250531B2

(12) United States Patent
Pfeffer et al.

(10) Patent No.: US 12,250,531 B2
(45) Date of Patent: Mar. 11, 2025

(54) LOUDSPEAKER

(71) Applicant: Harman Becker Automotive Systems GmbH, Karlsbad (DE)

(72) Inventors: Andreas Helmut Pfeffer, Wenzenbach (DE); Maximilian Josef Kneilling, Hohenried (DE)

(73) Assignee: Harman Becker Automotive Systems GmbH, Karlsbad (DE)

(*) Notice: Subject to any disclaimer, the term of this patent is extended or adjusted under 35 U.S.C. 154(b) by 192 days.

(21) Appl. No.: 17/943,529

(22) Filed: Sep. 13, 2022

(65) Prior Publication Data

US 2023/0097602 A1 Mar. 30, 2023

(30) Foreign Application Priority Data

Sep. 30, 2021 (EP) .................................... 21200094

(51) Int. Cl.
*H04R 9/06* (2006.01)
*H04R 9/02* (2006.01)
*H04R 9/04* (2006.01)

(52) U.S. Cl.
CPC ............. *H04R 9/025* (2013.01); *H04R 9/046* (2013.01); *H04R 9/06* (2013.01)

(58) Field of Classification Search
CPC ........... H04R 9/025; H04R 9/046; H04R 9/06
See application file for complete search history.

(56) References Cited

U.S. PATENT DOCUMENTS

| | | | | | |
|---|---|---|---|---|---|
| 4,472,605 | A * | 9/1984 | Klein | H04R 1/403 181/173 | |
| 6,622,817 | B1 | 9/2003 | Bachmann et al. | | |
| 6,744,895 | B2 * | 6/2004 | Miyamoto | H04R 9/10 381/342 | |
| 10,743,097 | B1 * | 8/2020 | Cho | H04R 7/127 | |
| 2008/0317255 | A1 * | 12/2008 | Cozens | H04R 9/10 381/182 | |
| 2021/0227331 | A1 * | 7/2021 | Oclee-Brown | H04R 1/2873 | |
| 2022/0210570 | A1 * | 6/2022 | Ko | H04R 9/043 | |
| 2023/0388701 | A1 * | 11/2023 | Struzik | H04R 1/025 | |

FOREIGN PATENT DOCUMENTS

| | | | |
|---|---|---|---|
| FR | 2812751 | A1 | 2/2002 |
| WO | 2015049218 | A1 | 4/2015 |

OTHER PUBLICATIONS

Extended European Search Report for Application No. 21200094.7 dated Mar. 23, 2022, 9 pgs.

* cited by examiner

*Primary Examiner* — Suhan Ni
(74) *Attorney, Agent, or Firm* — Brooks Kushman P.C.

(57) ABSTRACT

A loudspeaker including a first diaphragm, a second diaphragm spaced from the first diaphragm, a first voice coil coupled to the first diaphragm, a second voice coil coupled to the second diaphragm, and a magnet assembly. The magnet assembly includes a magnet, a magnetic piece and a spacer of non-magnetic material connecting the magnet and the magnetic piece such that a gap is provided between the magnet and the magnetic piece. The first voice coil is arranged at a first end of the gap and the second voice coil is arranged at a second end of the gap opposite the first end of the gap.

17 Claims, 10 Drawing Sheets

LOUDSPEAKER

CROSS-REFERENCE TO RELATED APPLICATIONS

This application claims priority to European application Serial No. 21200094.7 filed Sep. 30, 2021, the disclosure of which is hereby incorporated in its entirety by reference herein.

TECHNICAL FIELD

The present application relates to the field of loudspeakers, in particular to the field of so-called dynamic loudspeakers with a moving voice coil.

BACKGROUND

Loudspeakers are widely used in various areas, for example, in consumer products like radios, television sets, audio players, computers, mobile phones and electronic musical instruments, and commercial applications, for example sound reinforcement in theatres, concert halls, and public address systems. Furthermore, in vehicles, for example planes, ships and cars, loudspeakers are widely used.

A loudspeaker may comprise a magnet, in particular a permanent magnet, a voice coil arranged in a magnetic field provided by the magnet, a diaphragm (also called membrane) coupled to the voice coil and elastically coupled via a suspension (also called surround) to a frame of the loudspeaker. For example, the voice coil may be a coil of wire capable of moving axially in a cylindrical gap containing a concentrated magnetic field produced by the permanent magnet. When an alternating electrical current of for example an electrical audio signal is applied to the voice coil, the voice coil is forced to move back and force due to the Faraday's law of induction, which causes the membrane attached to the voice coil to move back and forth, pushing on the air to create sound waves. The combination of magnet and voice coil is also called drive unit or electromagnetic motor system. Arrangement and properties of the magnet and voice coil may affect characteristics of a loudspeaker. Characteristics of a loudspeaker may relate to efficiency, i.e., the sound power output divided by the electrical power input, sensitivity, i.e., the sound pressure level at, for example, 1 W electrical input measured at 1 meter, linearity or frequency response, maximum acoustic output power, size and weight. Characteristics may be different for different frequencies, for example, small loudspeakers may have lower efficiency at low frequencies than large loudspeakers.

In particular, in vehicles, a plurality of loudspeakers may be arranged at different locations to provide adequate sound output for each occupant. For example, loudspeakers may be arranged in the dashboard, doors, the ceiling, seats and headrests. A full-spectrum audio output may require large installation space, in particular the output of low bass frequencies may require large loudspeakers and large volumes. However, installation space may be sparse, in particular, e.g., in headrests.

SUMMARY

In view of the above, there is a need in the art to improve at least some of the above characteristics of a loudspeaker. For example, there is a need for compact sized loudspeakers providing high efficiency, in particular, at low frequencies.

According to the present invention, a loudspeaker as defined in the independent claim is provided. The dependent claims define embodiments of the invention.

According to various examples, a loudspeaker comprises a first diaphragm and a second diaphragm. The first diaphragm is arranged spaced apart from the second diaphragm. The loudspeaker comprises furthermore a first voice coil coupled to the first diaphragm, a second voice coil coupled to the second diaphragm, and a magnet assembly. The magnet assembly comprises a magnet, a magnetic piece and a spacer of non-magnetic material connecting the magnet and the magnetic piece such that a gap is provided between the magnet and the magnetic piece. The first voice coil is arranged at a first end of the gap and the second voice coil is arranged at a second end of the gap opposite the first end of the gap.

For example, the magnet may have a right hollow cylindrical shape and the magnetic piece may have also right hollow cylindrical shape. The magnet may have a ring-shaped cross section. The magnetic piece may also have a ring-shaped cross section. The magnetic piece may be smaller than the magnet such that it can be inserted into the hollow space of the magnet. In other examples, the magnetic piece may be larger than the magnet such that the magnet can be inserted into the hollow space of the magnetic piece. The gap between the magnet and the magnetic piece may have a right hollow cylindrical shape. In some examples, the gap may have a ring-shaped cross section. The magnet, the magnetic piece and thus the gap may have any other appropriate shape, for example a right hollow cylindrical shape with a cross section having an inner and/or outer circumference in the shape of a polygon, an ellipse or a combination of straight and/or curved sections.

A width of the gap may relate to the distance between the magnet and the magnetic piece. The spacer may determine the width of the gap. The spacer may occupy a part of the gap. However, in particular, the ends of the gap may not be occupied by the spacer thus providing at each end a corresponding air gap for receiving the first voice coil and the second voice coil, respectively.

The first voice coil may be configured and arranged such that it enters from the first end of the gap into the air gap. The first end of the gap may be a base of the right hollow cylindrical shape. The second voice coil may be configured and arranged such that the second voice coil enters from the opposite second end or base of the gap into the air gap. The air gaps may have a width of a few millimeters, for example, in a range of 1 to 5 millimeters.

The non-magnetic spacer may be arranged at a center along a height of the gap. The non-magnetic spacer may define the gap width and assuring a fixed arrangement of the magnet with respect to the magnetic piece. The height of the gap may be in a range of a few millimeters to a few centimeters, for example, in a range of 10 to 50 millimeters.

The magnet may be made of a magnetic material, i.e., the magnet may be a permanent magnet. The magnet may have a first magnetic polarity at the first end of the gap and a second magnetic polarity at the second end of the gap. In other words, the magnet may have a first magnetic polarity at a first end or base of the magnet and a second magnetic polarity at a second opposing end or base of the magnet. The first magnetic polarity may be different from the second magnetic polarity. For example, the first magnetic polarity may be a magnetic north pole and the second magnetic polarity may be a magnetic south pole, or vice versa.

The magnetic material of the magnetic piece may comprise any ferromagnetic material, for example iron, a cobalt, nickel, or a combination thereof.

The non-magnetic material of the spacer may comprise for example plastics. However, the non-magnetic material may comprise any other paramagnetic, diamagnetic or anti-ferromagnetic material. The non-magnetic material may comprise a combination of non-magnetic materials, for example plastics, resin, paper, glass fibers, carbon fibers and so on. The spacer may be coupled to the magnet and the magnetic piece by any appropriate mounting technology, for example gluing or press fitting.

The first diaphragm may be arranged proximate to the first end of the gap and the second diaphragm may be arranged proximate to the second end of the gap such that the first diaphragm and the second diaphragm are arranged at opposite sides of the gap. At least within the gap of the magnet assembly a first magnetic field is provided at the first end of the gap and a second magnetic field is provided at the second end of the gap due to the arrangement of the magnet and the magnetic piece. Thus, two voice coils in connection with two diaphragms may be driven in corresponding first and second magnetic fields, wherein these first and second magnetic fields are created by a single magnet assembly, comprising in particular a single magnet only. Thus, the loudspeaker may have a compact and light weight design and may require small installation space while providing high efficiency and high-power output due to the two driven diaphragms.

The magnet assembly may comprise at least one hollow cylindrical (washer-shaped) pole piece. In particular, the magnet assembly may comprise two pole pieces. For example, a first pole piece may be arranged at the first end of the gap, and a second pole piece may be arranged at the second end of the gap. Each pole piece may be made of magnetic material, for example, iron. Each pole piece may be coupled to the magnet. For example, the magnet may be a single ring magnet arranged coaxially between the first and second pole pieces.

In various examples, an outer diameter of the magnetic piece is smaller than an inner diameter of the magnet. In some examples, a height of the magnetic piece may be larger than the height of the magnet, for example, the height of the magnetic piece may correspond essentially to the height of the magnet plus the height of the first pole piece and the height of the second pole piece. In other examples, the height of the magnetic piece may be essentially the same as a height of the magnet. The magnetic piece may be arranged within the magnet with the spacer arranged between the magnetic piece and the magnet. The spacer may have at least partially a smaller height than the magnetic piece and the magnet. The spacer may be arranged at the center in the height direction of the magnetic piece and/or magnet. The spacer may have at least partially an annular shape in cross section. An inner surface of the spacer may be mounted at an outer surface of the magnetic piece, for example, by gluing or press fitting. An inner surface of the magnet may be mounted at an outer surface of the spacer, for example, by gluing or press fitting. As a result, the gap between the magnet and the magnetic piece is at least partially filled with the spacer, wherein at least the ends of the gap are not filled with the spacer to accommodate the voice coils. However, the voice coils may be configured and arranged such that the voice coils do not contact the magnetic piece and the magnet and are movable within the gap in the height direction of the gap upon a magnetic force induced by a driving current through the corresponding voice coil and the magnetic field within the gap. Arranging the magnet outside the magnetic piece reduces restrictions on the form and size of the magnet thus allowing the use of powerful magnets and appropriate magnet designs.

In further examples, an inner diameter of the magnetic piece is larger than an outer diameter of the magnet. In some examples, a height of the magnetic piece may be larger than the height of the magnet, for example the height of the magnetic piece may correspond essentially to the height of the magnet plus the height of the first pole piece and the height of the second pole piece. In other examples, the height of the magnetic piece may be essentially the same as a height of the magnet. The magnet may be arranged within the magnetic piece with the spacer arranged between the magnetic piece and the magnet. The spacer may have at least partially a smaller height than the magnetic piece and the magnet. The spacer may be arranged at the center in the height direction of the magnetic piece and/or magnet. The spacer may have at least partially an annular shape. An inner surface of the spacer may be mounted at an outer surface of the magnet, for example by gluing or press fitting. An inner surface of the magnetic piece may be mounted at an outer surface of the spacer, for example, by gluing or press fitting. As a result, the gap between the magnet and the magnetic piece is at least partially filled with the spacer, wherein at least the ends of the gap are not filled with the spacer to accommodate the voice coils.

For example, the first voice coil is arranged at least partially inside the gap at one end of the gap, and the second voice coil is arranged at least partially inside the gap at another opposite end of the gap. The voice coils may be configured and arranged such that the voice coils do not contact the magnetic piece and the magnet and are movable within the gap in the height direction of the gap upon a magnetic force induced by a driving current through the corresponding voice coil and the magnetic field within the gap. Arranging the magnet inside the magnetic piece may reduce the size of the magnet assembly thus allowing a compact design of the loudspeaker.

According to various examples, the magnet comprises a ring magnet with an axial magnetization, i.e., the magnet may have a right hollow cylindrical shape with a ring-shaped cross section. However, the magnet may have any other shape which may be rotationally symmetrical or non-rotationally symmetrical, for example an ellipsoid shape, a polygon shape, a curved shape, or a combination of straight and curved sections. A shape of an inner surface of the magnet may have the same shape as an outer surface of the magnet or the inner surface of the magnet and the outer surface and of the magnet may have different shapes, for example, the inner surface may have a circular shape and the outer surface may have a polygonal shape. In any case, the magnetization may be in the height direction, for example along an axis of rotational symmetry. In combination with the magnetic piece, within the gap a magnetic field (e.g., B-field) may extend in a radial direction, at least at the first end and second end of the gap. The magnetic field at the first end of the gap may extend in a direction opposite to a direction of the magnetic field at the second end of the gap. For example, at the first end the magnetic field may be directed in a radially inward direction, and at the second end the magnetic field may be directed in a radially outward direction.

Furthermore, the loudspeaker may comprise a basket or frame coupled to at least one of the magnet and the magnetic piece. The basket may be made of plastics or metal, e.g., aluminum, and may provide supports for mounting the loudspeaker at the place of installation, for example in a door or a headrest of a car.

The diaphragms may be mounted at the basket. For example, the loudspeaker may comprise a first surround coupling an outer circumference of the first diaphragm to the basket, and a second surround coupling an outer circumference of the second diaphragm to the basket. The first surround and second surround may be made of elastic materials, for example rubber or plastics. The basket may support the first diaphragm, the second diaphragm and the magnet assembly in a sandwiched manner with the magnet assembly being arranged between the first diaphragm and the second diaphragm. Thus, a main direction of sound radiation of the first diaphragm and a main direction of sound radiation of the second diaphragm may be oppositely directed. When the loudspeaker is arranged for example in a headrest of a vehicle, an interior can be effectively provided with sound.

In various examples, the first voice coil is coupled to the first diaphragm near or at an outer circumference of the first diaphragm and the second voice coil is coupled to the second diaphragm near or at an outer circumference of the second diaphragm. Arranging and coupling the voice coil at or near an outer circumference of the diaphragm results in a large diameter of the voice coil and a correspondingly large diameter of the gap of the magnet assembly. Large mechanical forces can be generated between the voice coil and the magnetic field in the gap and transferred homogeneously to the diaphragm. Large acoustic output power and high efficiency may be achieved at a compact design.

According to various examples, the loudspeaker comprises an elastic element arranged between the first diaphragm and the second diaphragm. For example, a first end of the elastic element is coupled to a center of the first diaphragm and a second end of the elastic element is coupled to a center of the second diaphragm. The first and second ends of the elastic element may be ends at opposite sides of the elastic element in a longitudinal direction. The elastic element may be configured to exert a counterforce upon compression and/or extension of the elastic element in the longitudinal direction of the elastic element. The elastic element may comprise for example a spring element comprising one or more springs of elastic material, for example, plastics or metal. In other examples, the elastic element may comprise an element made of rubber or foam having a cylindrical shape or bellows shape. The elastic element may support a linear guidance of the diaphragms thus controlling amplitude of the diaphragms and avoiding lateral movement of the diaphragms. Furthermore, the elastic element may support linearity of deflection of the diaphragms in operation.

In various examples of the present application, a coupling of an end of the elastic element to a center of a diaphragm is described. However, such a coupling does not necessarily mean that the elastic element is in contact with the center of the diaphragm. For example, the end of the elastic element may be coupled to the diaphragm in any appropriate way around or near the center of the diaphragm, for example in a symmetric way with respect to an axis of rotational symmetry of the diaphragm such that a force from the elastic element is applied evenly to the surface of the diaphragm. As a result, a deflection movement may preferably evenly performed over a large area along the longitudinal direction.

In some examples, each end of the elastic element may be coupled directly to the corresponding diaphragm. In other examples, a first fixation pad is arranged between the first end of the elastic element and the first diaphragm, in particular the center of the first diaphragm, and a second fixation pad is arranged between the second end of the elastic element and the second diaphragm, in particular the center of the second diaphragm. The fixation pads may enable homogeneous transmission of forces between the elastic element and the first and second diaphragms.

According to various examples, the gap has a rotational symmetry with an axis of rotational symmetry. The first diaphragm may have a rotationally symmetric shape with its axis of rotational symmetry extending coaxially with the axis of rotational symmetry of the gap. Likewise, the second diaphragm may have a rotational symmetric shape with an axis of rotational symmetry of the second diaphragm extending coaxially with the axis of rotational symmetry of the gap. Thus, the first and second diaphragms are aligned and may share the magnetic field provided in the gap by a single magnet.

Furthermore, the first diaphragm may have a dome shape or spherical shape with the base of the dome/spherical shape extending in a first plane perpendicular to the axis of rotational symmetry of the gap. The second diaphragm may also have a dome shape or spherical shape with the base of the dome/spherical shape extending in a second plane perpendicular to the axis of rotational symmetry of the gap. An apex of the dome/spherical shape of the first diaphragm is outside the area between the first and second planes, and an apex of the dome/spherical shape of the second diaphragm is outside the area between the first and second planes. In other words, the height of the dome/spherical shape of the first diaphragm extends in a direction opposite to a direction in which the height of the dome/spherical shape of the second diaphragm extends. As a result, the first and second diaphragms may radiate sound in opposite directions. The gap may extend between and outer circumference of the first diaphragm and an outer circumference of the second diaphragm. Thus, the magnet assembly is at least partially arranged within a volume defined by the first and second diaphragms. This enables a compact design of the loudspeaker and a use of the loudspeaker in confined installation spaces, for example in a headrest of a vehicle.

In various examples, the axes of rotational symmetry of the voice coils, the magnet, the magnetic piece, the gap, the first and second diaphragms and/or the elastic element may be aligned to each other.

It is to be understood that the features mentioned above and those described in detail below may be used not only in the described combinations, but also in other combinations or in isolation without departing from the scope of the invention.

DETAILED DESCRIPTION

Figure 1:
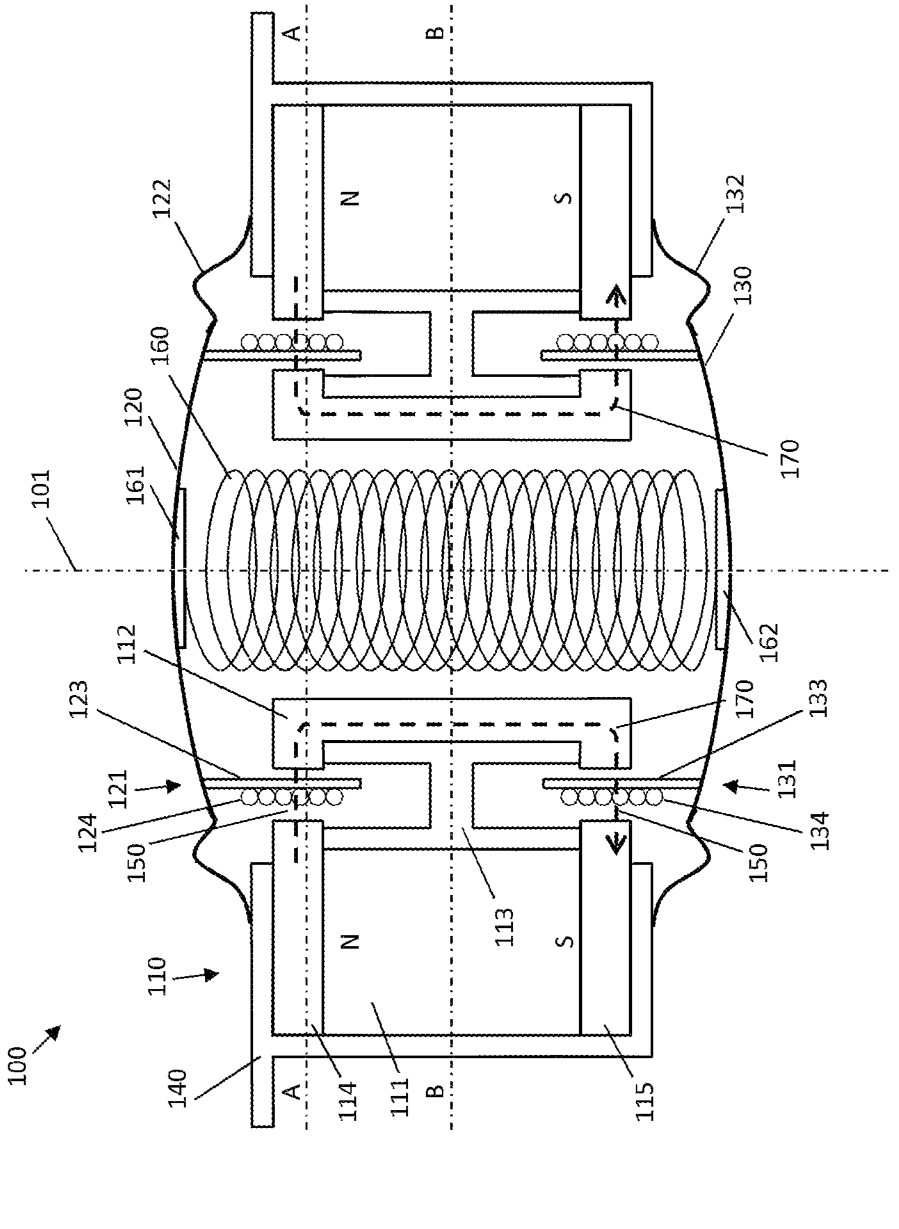
FIG. 1 schematically illustrates a sectional view of a loudspeaker according to various examples.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, components, or other physical or functional units shown in the drawings or described herein may also be implemented by an indirect connection or coupling.

Some examples of the present disclosure generally provide for a plurality of mechanical and electrical components. All references to the components and the functionality provided by each are not intended to be limited to encompassing only what is illustrated and described herein. While particular labels may be assigned to the various components disclosed, such labels are not intended to limit the scope of operation for the components. Such components may be combined with each other and/or separated in any manner based on the particular type of implementation that is desired.

FIG. 1 shows a sectional view of a loudspeaker 100. The sectional view is taken along a longitudinal axis 101 of the loudspeaker 100. Several of the below described components may have an axis of rotational symmetry, for example, cylindrical or tubular components, and the axis of rotational symmetry of such a component may be aligned to the longitudinal axis 101.

The loudspeaker 100 comprises a magnet assembly 110, a first diaphragm 120, a second diaphragm 130, and a basket 140. The magnet assembly 110, the first diaphragm 120, the second diaphragm 130, and at least parts of the basket 140 may each have a rotationally symmetrical shape with an axis of rotational symmetry aligned to the longitudinal axis 101.

The first diaphragm 120 is arranged spaced apart from the second diaphragm 130. The first diaphragm 120 has a dome shape with an apex of the dome shape directing in an upward direction along the longitudinal axis 101 in FIG. 1. The second diaphragm 130 has a dome shape with an apex of the dome shape directing in a downward direction along the longitudinal axis 101 in FIG. 1. The first and second diaphragms 120, 130 may have essentially the same shape which may be rotationally symmetric with respect to the longitudinal axis 101. The basket 140 is provided between the first diaphragm 120 and the second diaphragm 130. The first diaphragm 120 may be coupled to the basket 140 via a surround 122, and the second diaphragm 130 may be coupled to the basket 140 via a surround 132. The surrounds 122 and 132 may be made of an elastic material, for example a rubber or plastics. The surrounds 122 and 132 enable a back-and-forth movement of the diaphragms 120 and 130, respectively, in the direction of the longitudinal axis 101.

The above-described shape of the first and second diaphragms 120, 130 is an example and the first and second diaphragms 120, 130 may have any other shape, for example a conical shape, a flat disk shape, a spherical shape, a dome shape, a horn shape, a funnel shape or a combination thereof. Each of the first and second diaphragms 120, 130 may be made from one piece or assembled from several pieces, which are made of the same or different materials.

For example, the basket 140 in combination with the first and second diaphragms 120, 130 and the surrounds 122, 132 may form a closed enclosure such that the volume inside the loudspeaker 100 is essentially decoupled from a surrounding. In other examples, the volume inside the loudspeaker 100 may be coupled with surrounding volume, for example via openings in the basket 140.

The magnet assembly 110 is mounted within the basket 140. The magnet assembly 110 comprises a magnet 111, a magnetic piece 112 and a spacer 113. The magnet 111, the magnetic piece 112 and the spacer 113 may each have a rotationally symmetrical shape with an axis of rotational symmetry aligned to the longitudinal axis 101.

The spacer 113 is made of non-magnetic material, for example, a paramagnetic, diamagnetic, or antiferromagnetic material. For example, the spacer 113 may be made of plastics or a non-magnetic metal like aluminum.

The magnet 111 may comprise a permanent magnet comprising ferromagnetic materials, for example iron, nickel, cobalt and/or neodymium. Additionally, the magnet 111 may be provided at each end in the direction of longitudinal axis 101 with a corresponding pole piece, i.e., a first pole piece 114 at an upper end in FIG. 1 and a second pole piece 115 at a lower end in FIG. 1. The magnet 111 may be a hollow cylindrical magnet, a so-called ring magnet with a first magnetic polarity at the upper end in FIG. 1, for example a north pole N, and a second magnetic polarity at the lower end in FIG. 1, for example a south pole S. The first and second pole pieces 114, 115 may each have a washer shape with an axis of rotational symmetry aligned to the longitudinal axis 101. The first and second pole pieces 114 and 115 may be made of a ferromagnetic material, for example iron, nickel or cobalt such that they guide the magnetic field from the magnet 111 and may be considered to extend the poles of the magnet 111. Therefore, when the pole pieces 114 and 115 are present, in the following, the combination of magnet 111 and pole pieces 114, 115 will be referred to as magnet 111 also.

The magnetic piece 112 may be made of ferromagnetic material, for example iron, nickel or cobalt, and may have a hollow cylindrical shape with an axis of rotational symmetry aligned to the longitudinal axis 101. As shown in FIG. 1, an outer diameter of the magnetic piece 112 may be smaller than an inner diameter of the magnet 111. The spacer 113 couples the magnet 111 with the magnetic piece 112 such that at least at the upper and lower ends of the magnet 111 (including the pole pieces 114, 115) a gap 150 exists between the magnet 111 and the magnetic piece 112. The gap 150 may have a width in the radial direction of a few millimeters, for example in a range of 1 to 5 millimeters. The non-magnetic spacer may be arranged at a center of the gap 150 in a direction of the longitudinal axis 101. The spacer 113 defines the width of the gap 150 and assures a fixed arrangement of the magnet 111 with respect to the magnetic piece 112. A length of the magnet 111 and the magnetic piece 112 in the direction of the longitudinal axis 101 may be essentially the same and defines a length of the gap 150 in the direction of the longitudinal axis 101. The length of the gap 150 may be in the range of a few millimeters to a few centimeters, for example in a range of 10 to 50 millimeters. It is to be noticed that the gap 150 may be partly filled with the spacer 113. However, in particular the end sections of the gap 150, i.e., the upper end and the lower end in the direction of the longitudinal axis 101, may not be occupied by the spacer 113.

Due to the ferromagnetic properties of the magnetic piece 112, a magnetic field generated by the magnet 111 is guided in radial direction through the gap 150 and the magnetic piece 112. In detail, a magnetic field 170 (for example B-field) may propagate from the north pole N at the upper end of the magnet 111 (if present, via the first pole piece 114) in a radial direction to the upper end of the magnetic piece 114 which guides the magnetic field 170 in the downward direction within the magnetic piece 114 to the lower end of the magnetic piece 114, where it propagates in a radial direction to the south pole S at the lower end of the magnet 111 (if present, via the second pole piece 115).

Near an outer circumference of the first diaphragm 120 a first voice coil 121 is provided which extends into the gap 150 at the upper end of the magnet assembly 110. The first voice coil 121 comprises a tubular carrier 123 on which a plurality of coil windings 124 are arranged. The carrier 123 may be made of a non-magnetic material, for example paper, aluminum or plastics, like polyimide, for example, Kapton. An inner diameter of the carrier 123 is larger than an outer diameter of the magnetic piece 112. An outer diameter of the coil windings 124 is smaller than an inner diameter of the magnet 111. The voice coil 121 is movable in the direction of the longitudinal axis 101 in the up and down directions in FIG. 1.

Likewise, near an outer circumference of the second diaphragm 130, a second voice coil 131 is provided which extends into the gap 150 at the lower end of the magnet assembly 110. The second voice coil 131 comprises a tubular carrier 133 on which a plurality of coil windings 134 are arranged. The carrier 133 may be made of non-magnetic material. An inner diameter of the carrier 133 is larger than an outer diameter of the magnetic piece 112. An outer diameter of the coil windings 134 is smaller than an inner diameter of the magnet 111. The voice coil 131 is movable in the direction of the longitudinal axis 101 in the up and down directions in FIG. 1.

As a result, the first and second diaphragms 120 and 130 can be deflected independently by energizing the first and second voice coils 124 and 134. However, only a single magnet assembly 110 is needed which provides a gap 150 with magnetic fields in which both voice coils 124 and 134 may be operated.

For example, in operation of the loudspeaker 100, the diaphragms 120, 130 may be controlled such that they are moving in opposite directions. However, this is only an example and the diaphragms 120, 130 may be controlled independent from each other such that a movement of the first diaphragm 120 is controlled independent from the movement of the second diaphragm 130.

As further shown in FIG. 1, an elastic element 160 may be provided between the first diaphragm 120 and the second diaphragm 130. A first end of the elastic element 160 is coupled to a center, for example the apex, of the first diaphragm 120. A second end of the elastic element 160 is coupled to a center, for example the apex, of the second diaphragm 130. Optionally, a first fixation pad 161 may be arranged between the first end of the elastic element 160 and the first diaphragm 120, and a second fixation pad 162 may be arranged between the second end of the elastic element 160 and the second diaphragm 130. As shown in FIG. 1, the elastic element 160 may comprise a spring element, made for example of metal or plastics. Although not shown, the elastic element 160 may comprise a plurality of springs or may comprise a cylindrical or bellows-shaped hollow element of elastic material, for example rubber or foam.

As described above, some of the components of the loudspeaker 100 may have a rotational symmetry with respect to longitudinal axis 101. Therefore, components on the right-hand side in FIG. 1 are shown in symmetry to components on the left-hand side of FIG. 1. For further clarification, FIG. 2 shows a sectional view along sectional plane A-A and FIGS. 3 and 4 show sectional views of various examples along sectional plane B-B.

Figure 2:
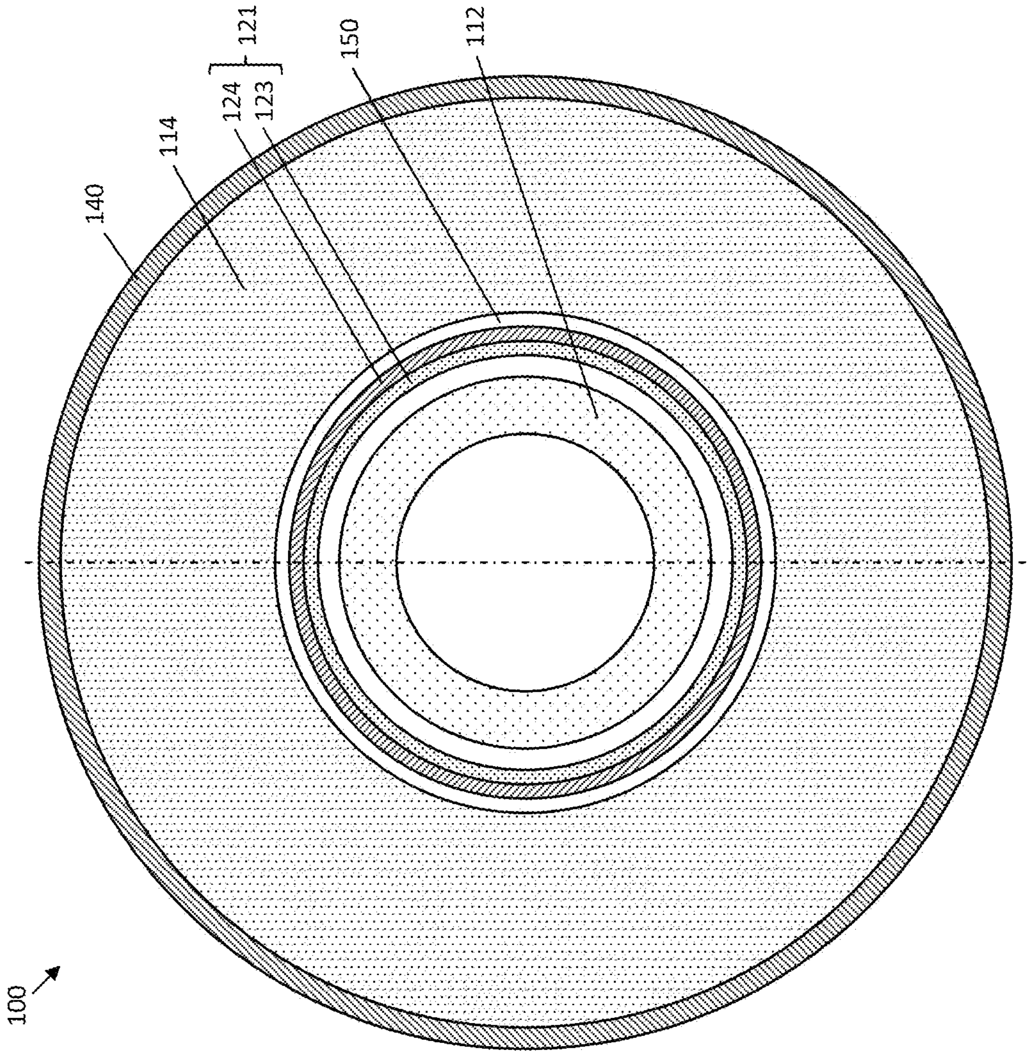
FIG. 2 schematically illustrates a sectional view of the loudspeaker of FIG. 1 along sectional plane A-A according to various examples.

FIG. 2 shows a sectional view along sectional plane A-A of FIG. 1. The sectional plane A-A extends perpendicular to the longitudinal axis 101. As shown, the basket 140 encloses the washer-shaped upper pole piece 114. Although, the basket 140 in the illustrated example completely encloses the pole piece 114, this is only an example, and the basket may have cutouts or may comprise of a plurality of parts coupled to the pole pieces 114, 115 and the magnet 111, for example by gluing or press fitting. Furthermore, the basket 140 may comprise support structures, for example connecting straps, for mounting the loudspeaker 100 at an installation space, for example in a door, dashboard, ceiling, seat or headrest of a vehicle. The upper pole piece 114 has an inner opening in which the magnetic piece 112 is arranged with a gap 150 between an inner circumference of the upper pole piece 114 and an out circumference of the magnetic piece 112. The first voice coil 121 comprising the carrier 123 and the coil windings 124 is at least partly arranged in the gap 150. A gap between an outer circumference of the coil windings 124 and an inner circumference of the pole piece 114 is provided such that the voice coil 121 does not contact the pole piece 114 when moving up and down along the direction of the longitudinal axis 101. Within the inner circumference of the voice coil 121, the magnetic piece 112 is arranged spaced apart from the inner circumference of the voice coil 121 such that the voice coil 121 does not contact the magnetic piece 112 when moving up and down along the direction of the longitudinal axis 101. The magnetic piece 112 may have a hollow cylindrical shape such that the cross section is a ring as shown in FIG. 2.

Figure 3:
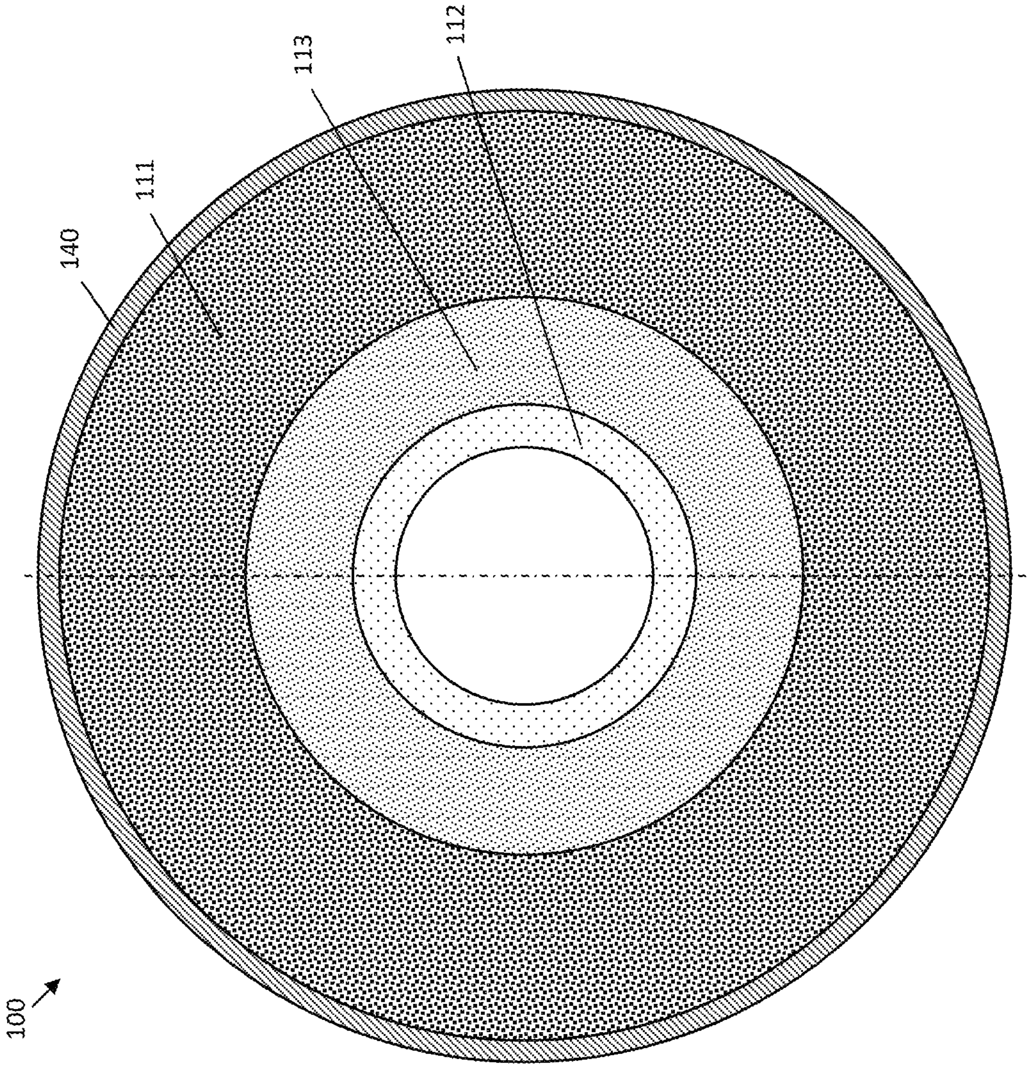
FIG. 3 schematically illustrates a sectional view of the loudspeaker of FIG. 1 along sectional plane B-B according to various examples.

FIG. 3 shows a sectional view along sectional plane B-B of FIG. 1. The sectional plane B-B extends perpendicular to the longitudinal axis 101 essentially in the center of the length of the magnet assembly 110. In particular, plane B-B extends through the spacer 113. As shown in FIG. 3 and described above in connection with FIG. 2, the basket 140 encloses the washer-shaped pole pieces 114, 115 and the magnet 111. The magnet 111 may be glued or press fitted to the basket 140. The magnet 111 is a ring magnet, i.e., the magnet 111 has hollow cylindrical shape. At an inner circumferential surface of the magnet 111 the spacer 113 is mounted, for example, by gluing or press fitting. At an inner circumference surface of the spacer 113, the magnetic piece 112 is mounted, for example, by gluing or press fitting. It is to be noticed, that in FIGS. 2 and 3 the elastic element 160 is not shown for reasons of clarity.

Figure 4:
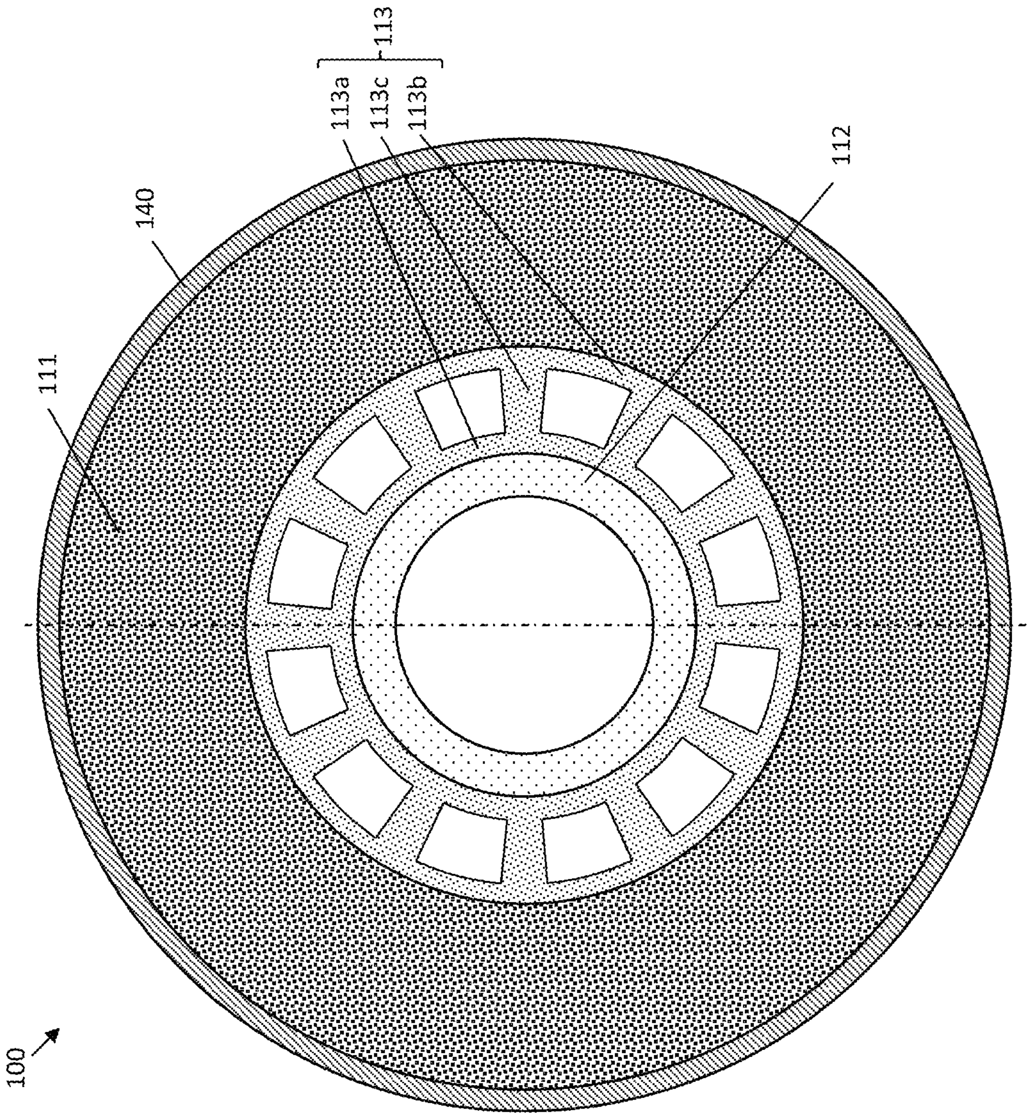
FIG. 4 schematically illustrates a sectional view of the loudspeaker of FIG. 1 along sectional plane B-B according to further examples.

FIG. 4 shows a sectional view along sectional plane B-B of FIG. 1 of another example of implementing the spacer 113. In the example of FIG. 4, the spacer 113 has cutouts thus forming an inner ring 113*a*, an out ring 113*b* and a plurality of spokes-like elements 113*c*. The inner ring 113*a* is in contact with the magnetic piece 112. The outer ring is in contact with the magnet 111 or the pole pieces 114, 115. The spoke-like elements 113*c* connect the inner ring 113*a* and the outer ring 113*b*. In the example shown in FIG. 4, the inner ring 113*a* is connected via twelve spoke-like elements 113*c* to the outer ring 113*b*. However, this is an example only, and the spacer 113 may have any other structure which allows a fixed arrangement of the magnetic piece 112 with respect to the magnet 111 and/or the pole pieces 114, 115.

Figure 5:
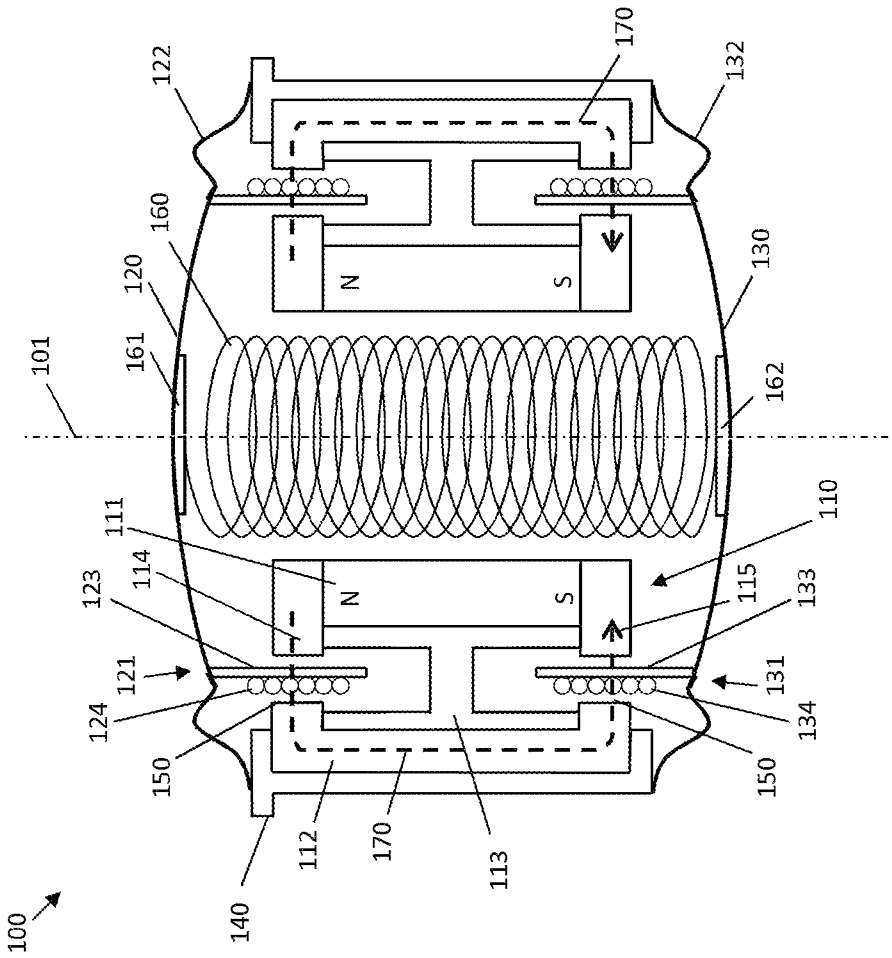
FIGS. 5 to 10 schematically illustrate sectional views of loudspeakers according to further examples.

FIG. 5 shows a further loudspeaker 100. Compared to the loudspeaker 100 shown in FIG. 1, in the loudspeaker 100 of FIG. 5 the magnet assembly 110 is modified such that the magnet 111 is arranged inside the magnetic piece 112. However, the functionality of the loudspeaker 100 of FIG. 5 is essentially the same as the functionality of the loudspeaker 100 of FIG. 1. The magnetic fields in the gap 150 for the first and second voice coils 121 and 131 are generated by a single magnet assembly 110, for example, a single ring magnet 111 in connection with the magnetic piece 112. The spacer 113 keeps the magnet 111 in position with respect to the magnetic piece 112.

Figure 6:
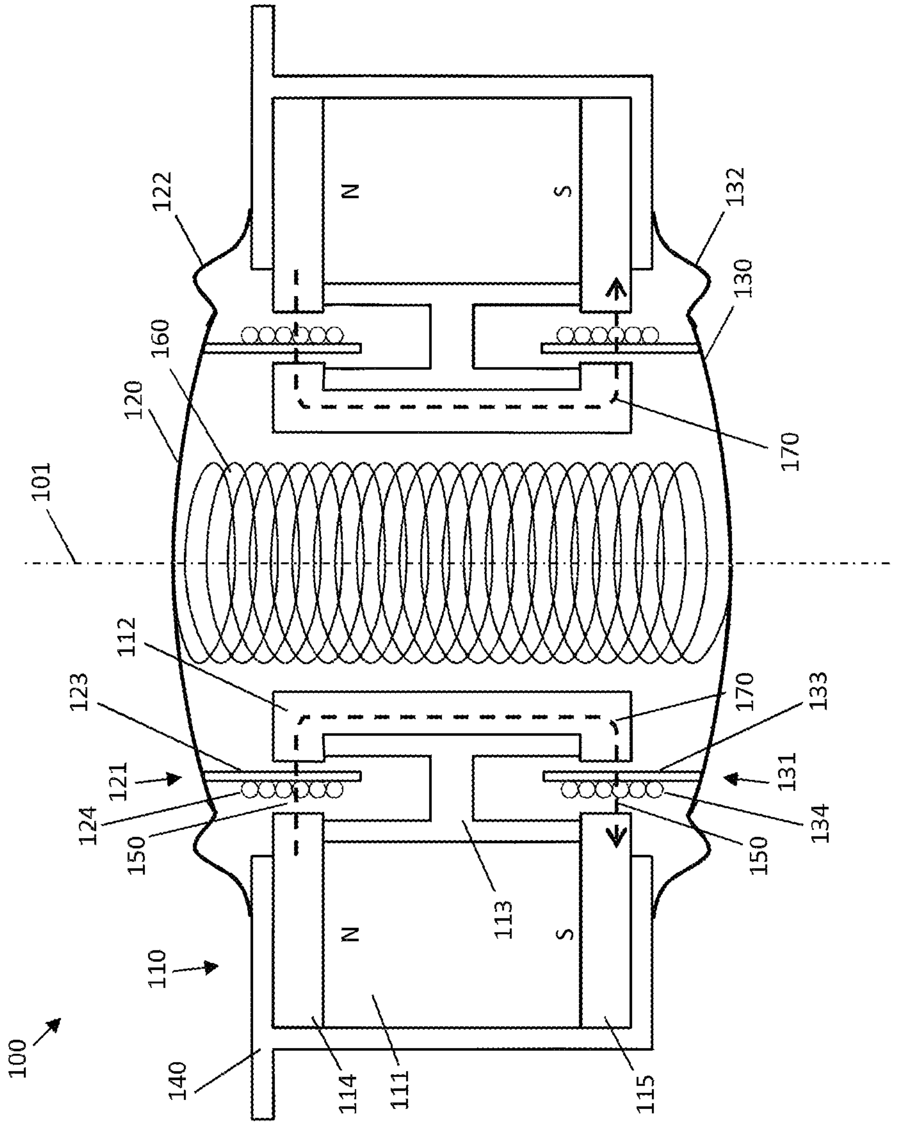

FIG. 6 illustrates a loudspeaker 100 which essentially corresponds to the loudspeaker 100 of FIG. 1. In contrast to FIG. 1, the optional first and second fixation pads 161 and 162 are not present in the loudspeaker 100 of FIG. 6. Instead, the first end of the elastic element 160 is directly coupled to the center, for example, the apex, of the first diaphragm 120, and the second end of the elastic element 160 is directly coupled to the center, for example, the apex, of the second diaphragm 130, for example by gluing.

Figure 7:
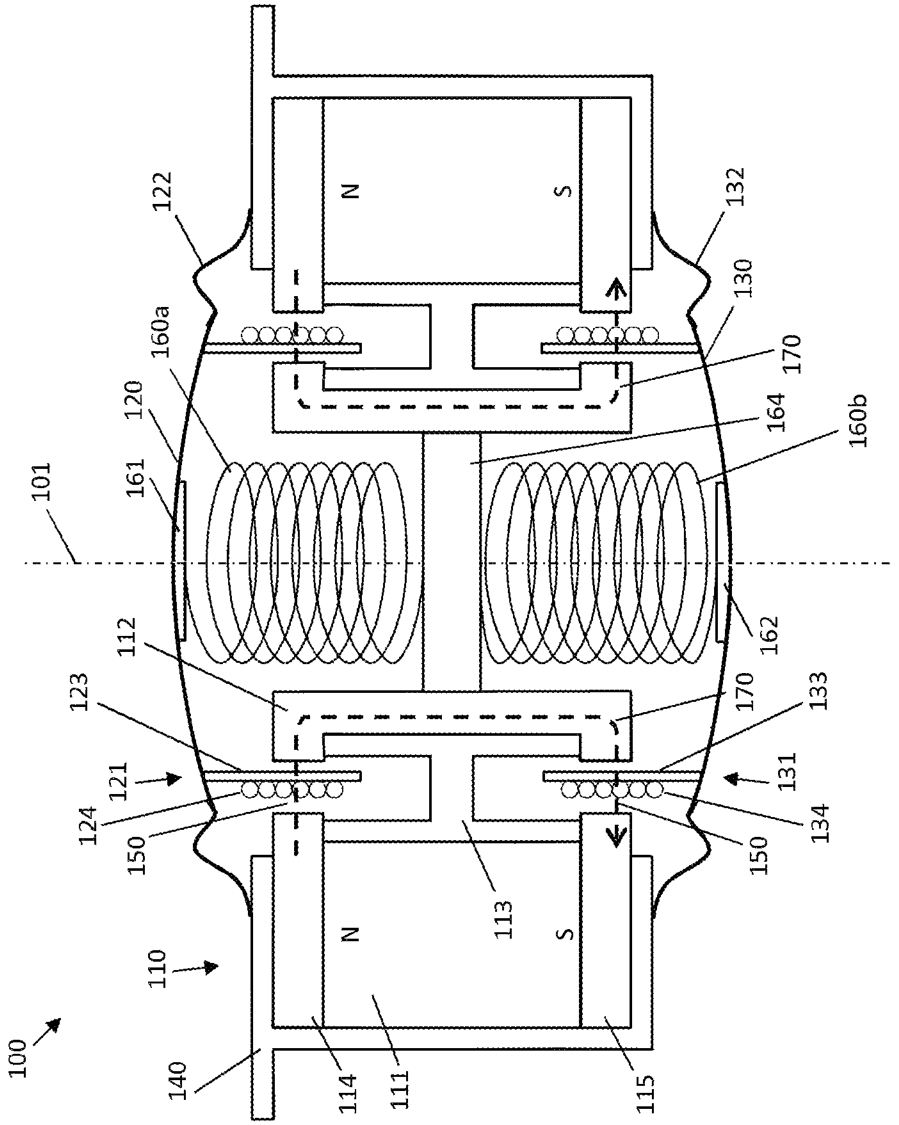

FIG. 7 illustrates a further loudspeaker 100. Compared to the loudspeaker 100 shown in FIG. 1, the loudspeaker 100 of FIG. 7 comprises a support element 164 arranged within the magnetic piece 112 at a central position with respect to the longitudinal axis 101. For example, the support element 164 may have a disk shape. An outer diameter of the support element 164 may be essentially the same as an inner diameter of the magnetic piece 112. In other examples, the support element 164 may have a bar shape extending along an inner diameter of the magnetic piece 112. The support element 164 may be fixed within the magnetic piece 112 by press fitting or gluing.

Instead of the elastic element 160 of loudspeaker 100 shown in FIG. 1, the loudspeaker 100 of FIG. 7 may be provided with a first elastic element 160*a* between the first diaphragm 120 and the support element 164, and with a second elastic element 160*b* between the second diaphragm 130 and the support element 164. A first end of the first elastic element 160*a* is coupled to a center, for example the apex, of the first diaphragm 120. A second end of the first elastic element 160*a* is coupled to one side of the support element 164. A first end of the second elastic element 160*b* is coupled to a center, for example the apex, of the second diaphragm 130. A second end of the second elastic element 160*b* is coupled to another side of the support element 164. Optionally, a first fixation pad 161 may be arranged between the first end of the first elastic element 160*a* and the first diaphragm 120, and a second fixation pad 162 may be arranged between the first end of the second elastic element 160*b* and the second diaphragm 130. As shown in FIG. 7, the first and second elastic elements 160*a*, 160*b* may each comprise a spring element, made for example of metal or plastics. Although not shown, the first and second elastic elements 160*a*, 160*b* may each comprise a plurality of springs or may comprise a cylindrical or bellows-shaped hollow element of elastic material, for example rubber or foam. The use of the two separate elastic elements 160*a*, 160*b* may utilize controlling the diaphragms 120, 130 independent from each other, e.g., deflection of diaphragm 120 does not influence deflection of diaphragm 130.

Figure 8:
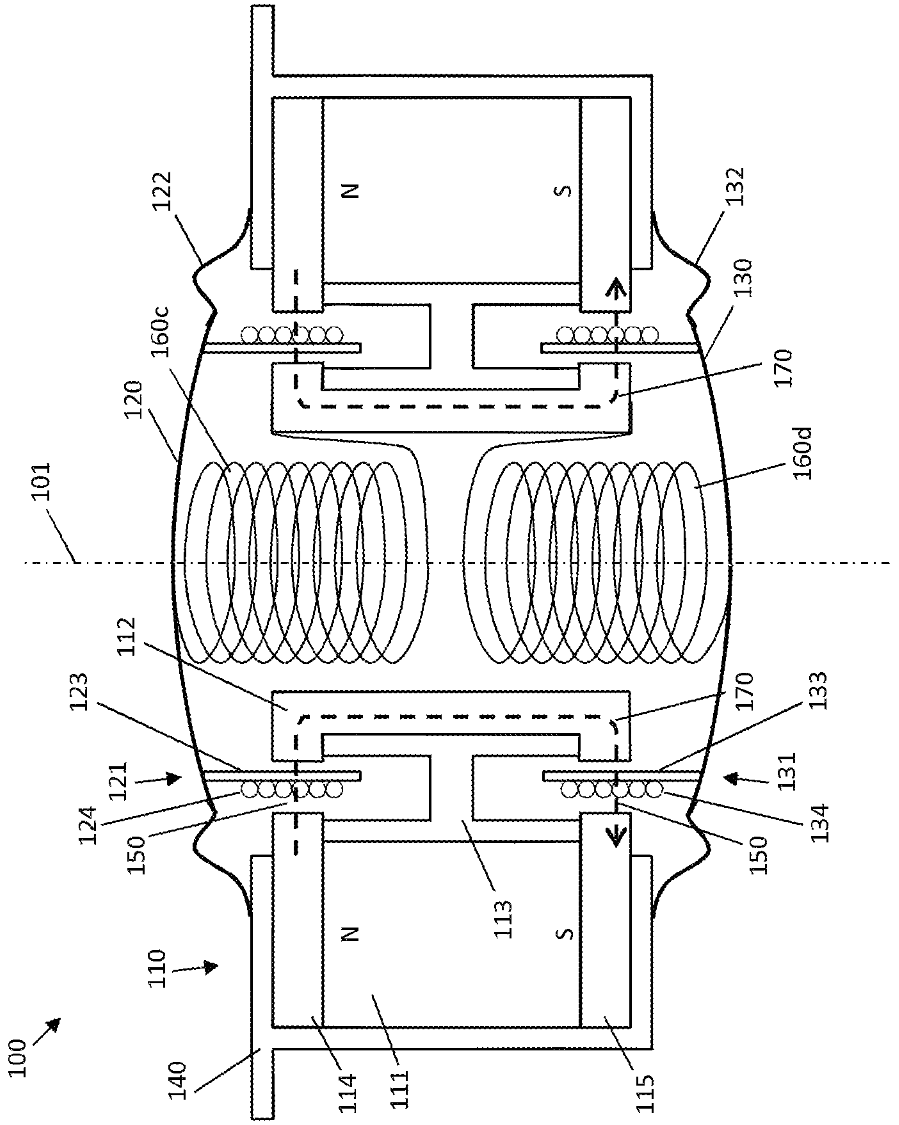

FIG. 8 illustrates a loudspeaker 100. Like the loudspeaker 100 of FIG: 7, the loudspeaker of FIG. 8 comprises two elastic elements 160*c* and 160*d*. However, loudspeaker 100 of FIG. 8 does not comprise the support element 164. The loudspeaker 100 of FIG. 8 comprises the first elastic element 160*c* and the second elastic element 160*d* arranged along the longitudinal axis 101 and at least partially within the magnetic piece 112. A first end of the first elastic element 160*c* is coupled to a center, for example, the apex, of the first diaphragm 120. A second end of the first elastic element 160*a* is coupled to the magnetic piece 112. For example, the first elastic element 160*c* may comprise a spring. A spring wire at the second end of the first elastic element 160*c* may be formed as shown in FIG. 8 to contact the magnetic piece 112, for example at an upper base of the magnetic piece 112. A first end of the second elastic element 160*d* is coupled to a center, for example the apex, of the second diaphragm 130. A second end of the second elastic element 160*d* is coupled to the magnetic piece 112. For example, the second elastic element 160*d* may comprise a spring. A spring wire at the second end of the second elastic element 160*d* may be formed as shown in FIG. 8 to contact the magnetic piece 112, for example at a lower base of the magnetic piece 112. The spring wires may be fixed to the magnetic piece 112 by gluing, welding or soldering.

In general, the elastic elements may provide guidance in the direction of the longitudinal axis 101. For example, the elastic elements may inhibit or reduce a deflection of the corresponding diaphragm 120, 130 in the lateral direction, i.e., in a radial direction perpendicular to the longitudinal axis 101. The elastic elements enable deflection in the direction of the longitudinal axis 101 and provide a restoring force to the rest position for the corresponding diaphragm 120, 130.

Figure 9:
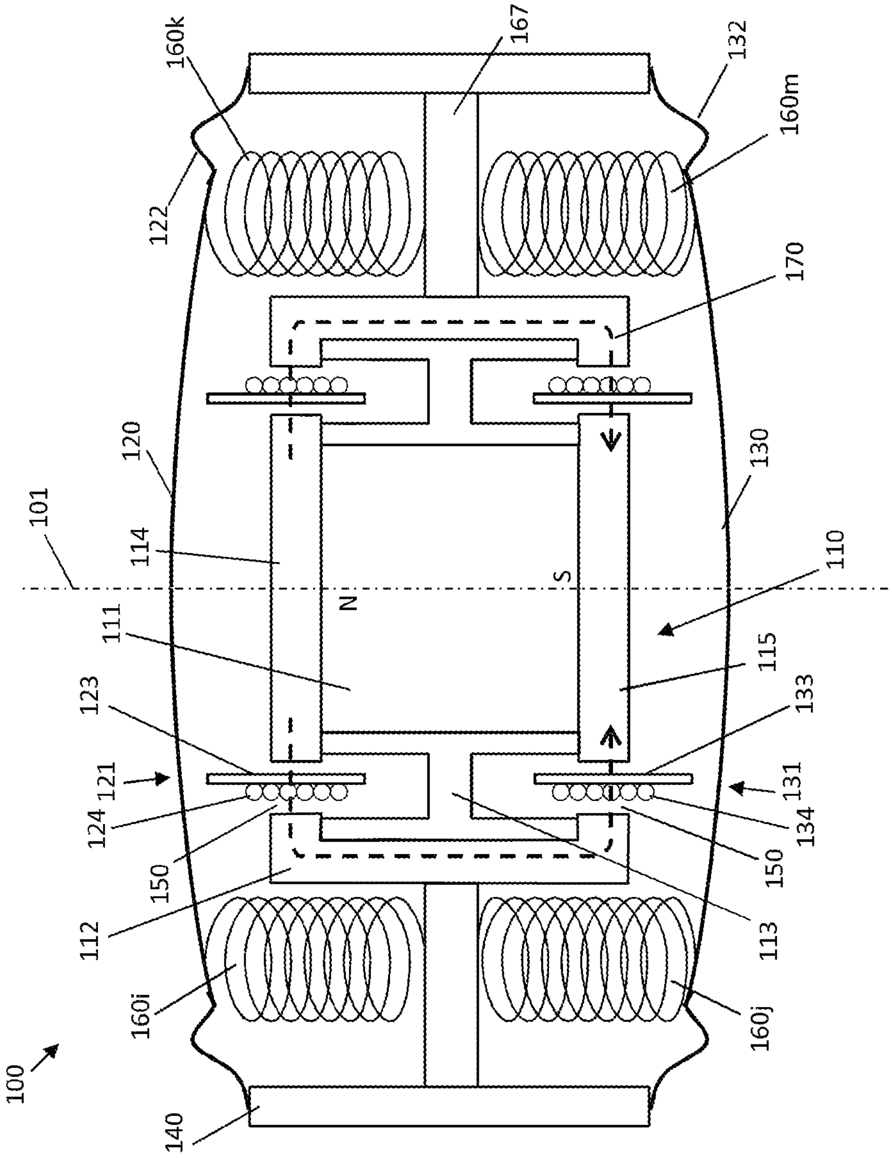

FIG. 9 shows a further loudspeaker 100 with a magnet assembly 110 in which the magnet 111 is arranged inside the magnetic piece 112. The functionality of the loudspeaker 100 of FIG. 9 is essentially the same as the functionality of the loudspeaker 100 of FIG. 1. The magnetic fields in the gap 150 for the first and second voice coils 121 and 131 are generated by a single magnet assembly 110, for example, a single disk magnet 111 in connection with disk shaped pole pieces 114, 115 and the magnetic piece 112. The spacer 113 keeps the magnet 111 in position with respect to the magnetic piece 112. A washer shaped support ring 167 is provided between the basket 140 and the magnetic piece 112 to keep the magnetic piece 112 in position with respect to the basket 140. Elastic elements 160*i*, 160*j*, 160*k* and 160*m* are provided between the support ring 167 and the first and second diaphragms 120, 130. For example, elastic element 160*i* may be coupled between an upper side of the support ring 167 and the first diaphragm 120. At a diametric opposite position, the elastic element 160*k* may be coupled between the upper side of the support ring 167 and the first diaphragm 120. Likewise, elastic element 160*j* may be coupled between a lower side of the support ring 167 and the second diaphragm 130, and, at a diametric opposite position, the elastic element 160*m* may be coupled between the lower side of the support ring 167 and the second diaphragm 130. More than two elastic elements may be provided at each side of the support ring 167, for example three, four, six, eight or any other number. The elastic elements may be provided within an annular space delimited by the magnetic piece 112 and the basket 140. At each side of the support ring 167, the elastic elements 160 may be arranged at a uniform distance from each other in the circumferential direction, i.e. evenly distributed in the circumferential direction.

In other examples, only one elastic element may be provided at each side of the support ring 167, or one elastic element may be provided extending from the first diaphragm

120 to the second diaphragm 130. The elastic element may comprise for example a spring with an inner diameter larger than an outer diameter of the magnetic piece 112, or the elastic element may comprise for example a tubular element or a bellows-shaped hollow element made of rubber or foam with an inner diameter larger than an outer diameter of the magnetic piece 112. The elastic element may surround the magnetic piece 112 in a circumferential direction of the magnetic piece 112. The elastic element may be arranged within the annular space between the magnetic piece 112 and the basket 140 and may contact the first and/or second diaphragms 120, 130 near an outer edge of the first and second diaphragms 120, 130, respectively. An axis of rotational symmetry of the elastic element may be aligned to the longitudinal axis 101.

Figure 10:
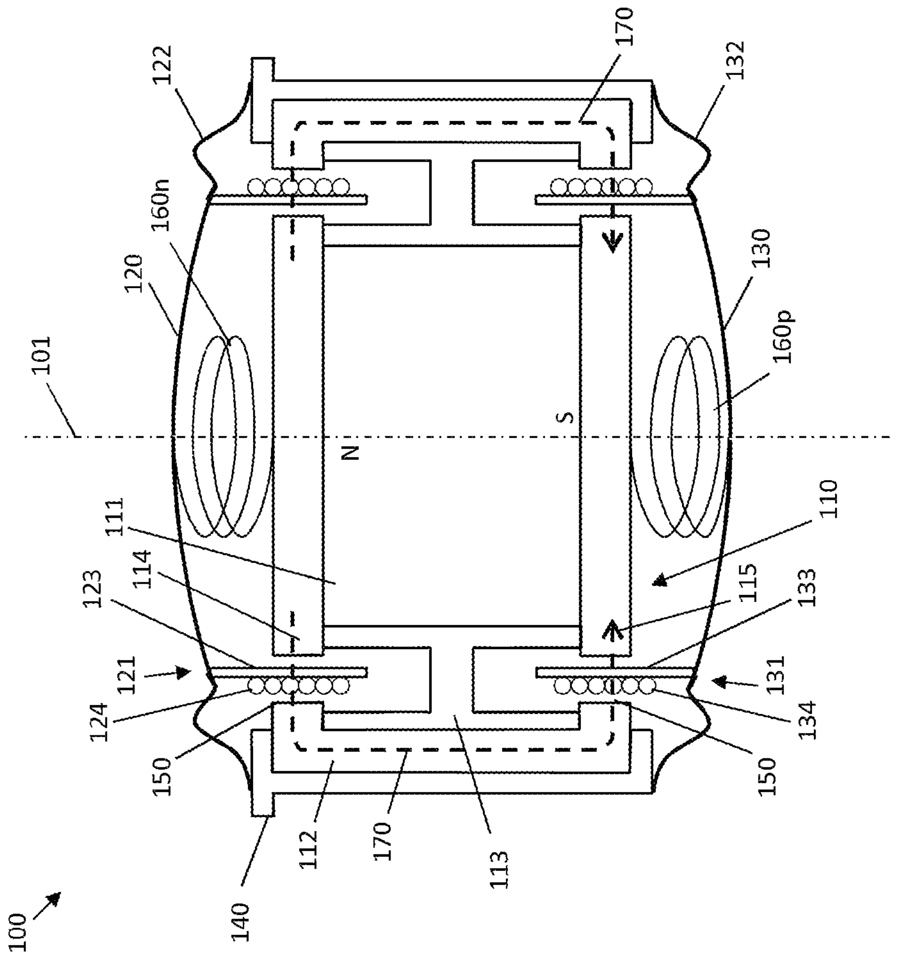

FIG. 10 shows a further loudspeaker 100 with a disk-shaped magnet 111 in connection with first and second disk shaped pole pieces 114, 115 as loudspeaker 100 shown in FIG. 9. The loudspeaker 100 of FIG. 10 comprises a first elastic element 160*n* between the first diaphragm 120 and the first pole piece 114 and a second elastic element 160*p* between the second diaphragm 130 and to the second pole piece 115. A first end of the first elastic element 160*n* is coupled to the first diaphragm 120. A second end of the first elastic element 160*n* is coupled to the first pole piece 114. A first end of the second elastic element 160*p* is coupled to the second diaphragm 130. A second end of the second elastic element 160*p* is coupled to the second pole piece 115. Optionally, a first fixation pad may be arranged between the first end of the first elastic element 160*n* and the first diaphragm 120, and a second fixation pad may be arranged between the first end of the second elastic element 160*p* and the second diaphragm 130. As shown in FIG. 10, the first and second elastic elements 160*n*, 160*p* may each comprise a spring element, made for example of metal or plastics. Although not shown, the first and second elastic elements 160*n*, 160*p* may each comprise a plurality of springs or may comprise a cylindrical or bellows-shaped hollow element of elastic material, for example rubber or foam. The use of the two separate elastic elements 160*n*, 160*p* may utilize controlling the diaphragms 120, 130 independent from each other, e.g., deflection of diaphragm 120 does not influence deflection of diaphragm 130.

What is claimed is:

1. A loudspeaker, comprising:

a first diaphragm;

a second diaphragm spaced from the first diaphragm;

a first voice coil coupled to the first diaphragm;

a second voice coil coupled to the second diaphragm;

a magnet assembly comprising a magnet, a magnetic piece and a spacer of non-magnetic material connecting the magnet and the magnetic piece such that a gap is provided between the magnet and the magnetic piece, wherein the first voice coil is arranged at a first end of the gap and the second voice coil is arranged at a second end of the gap opposite the first end of the gap; and an elastic element arranged between the first diaphragm and the second diaphragm, wherein a first end of the elastic element is coupled to a center of the first diaphragm, and a second end of the elastic element is coupled to a center of the second diaphragm.

2. The loudspeaker of claim 1, wherein the magnet has a first magnetic polarity at the first end of the gap and a second magnetic polarity at the second end of the gap, wherein the first magnetic polarity is different from the second magnetic polarity.

3. The loudspeaker of claim 1, wherein an outer diameter of the magnetic piece is smaller than an inner diameter of the magnet.

4. The loudspeaker of claim 1, wherein an outer diameter of the magnet is smaller than an inner diameter of the magnetic piece.

5. The loudspeaker of claim 1, wherein the magnet comprises a ring magnet with an axial magnetization.

6. The loudspeaker of claim 1, wherein the magnet assembly comprises at least one pole piece.

7. The loudspeaker of claim 1 further comprising a basket coupled to at least one of the magnet and the magnetic piece.

8. The loudspeaker of claim 7, further comprising a first surround coupling an outer circumference of the first diaphragm to the basket, and a second surround coupling an outer circumference of the second diaphragm to the basket.

9. The loudspeaker of claim 1, wherein the first voice coil is arranged at an outer circumference of the first diaphragm, and wherein the second voice coil is arranged at an outer circumference of the second diaphragm.

10. The loudspeaker of claim 1, wherein the first voice coil is arranged at least partially inside the gap, and wherein the second voice coil is arranged at least partially inside the gap.

11. The loudspeaker of claim 1, further comprising:

a first fixation pad arranged between the first end of the elastic element and the center of the first diaphragm, and a second fixation pad arranged between the second end of the elastic element and the center of the second diaphragm.

12. The loudspeaker of claim 1, wherein the elastic element comprises at least one spring element.

13. The loudspeaker of claim 1, wherein the magnet assembly is configured such that the gap has a rotationally symmetric shape, wherein the first diaphragm has a rotationally symmetric shape with its axis of rotational symmetry extending coaxially with an axis of rotational symmetry of the gap, and wherein the second diaphragm has a rotationally symmetric shape with its axis of rotational symmetry extending coaxially with the axis of rotational symmetry of the gap.

14. The loudspeaker of claim 13, wherein the first diaphragm has a dome shape with a base extending in a first plane perpendicular to the axis of rotational symmetry of the gap, wherein the second diaphragm has a dome shape with the base extending in a second plane parallel to and spaced from the first plane, and wherein an apex of the dome shape of the first diaphragm is outside an area between the first and second planes, and an apex of the dome shape of the second diaphragm is outside the area between the first and second planes.

15. The loudspeaker of claim 1, wherein the gap extends between an outer circumference of the first diaphragm and an outer circumference of the second diaphragm.

16. A loudspeaker, comprising:

a first diaphragm;

a second diaphragm;

a first voice coil coupled to the first diaphragm;

a second voice coil coupled to the second diaphragm, and a magnet assembly comprising a magnet, a magnetic piece and a spacer of non- magnetic material connecting the magnet and the magnetic piece such that a gap is provided between the magnet and the magnetic piece, wherein the first voice coil is arranged at a first end of the gap and the second voice coil is arranged at a second end of the gap opposite the first end of the gap; and an elastic element arranged between the first diaphragm and the second diaphragm, wherein a first end of the elastic element is coupled to a center of the first diaphragm, and a second end of the elastic element is coupled to a center of the second diaphragm.

17. A loudspeaker, comprising:

a first diaphragm;

a second diaphragm;

a first voice coil coupled to the first diaphragm;

a second voice coil coupled to the second diaphragm, and a magnet assembly comprising a magnet, a magnetic piece and a spacer of non- magnetic material connecting the magnet and the magnetic piece such that a gap is provided between the magnet and the magnetic piece, wherein the first voice coil is arranged at a first end of the gap and the second voice coil is arranged at a second end of the gap opposite the first end of the gap;

wherein the magnet assembly is configured such that the gap has a rotationally symmetric shape, wherein the first diaphragm has a rotationally symmetric shape with its axis of rotational symmetry extending coaxially with an axis of rotational symmetry of the gap, and wherein the second diaphragm has a rotationally symmetric shape with its axis of rotational symmetry extending coaxially with the axis of rotational symmetry of the gap.

* * * * *